L. E. L. THEMKE & E. LA FORCE.
MARINE ENGINE GOVERNOR.
APPLICATION FILED FEB. 24, 1908.
916,627.
Patented Mar. 30, 1909.
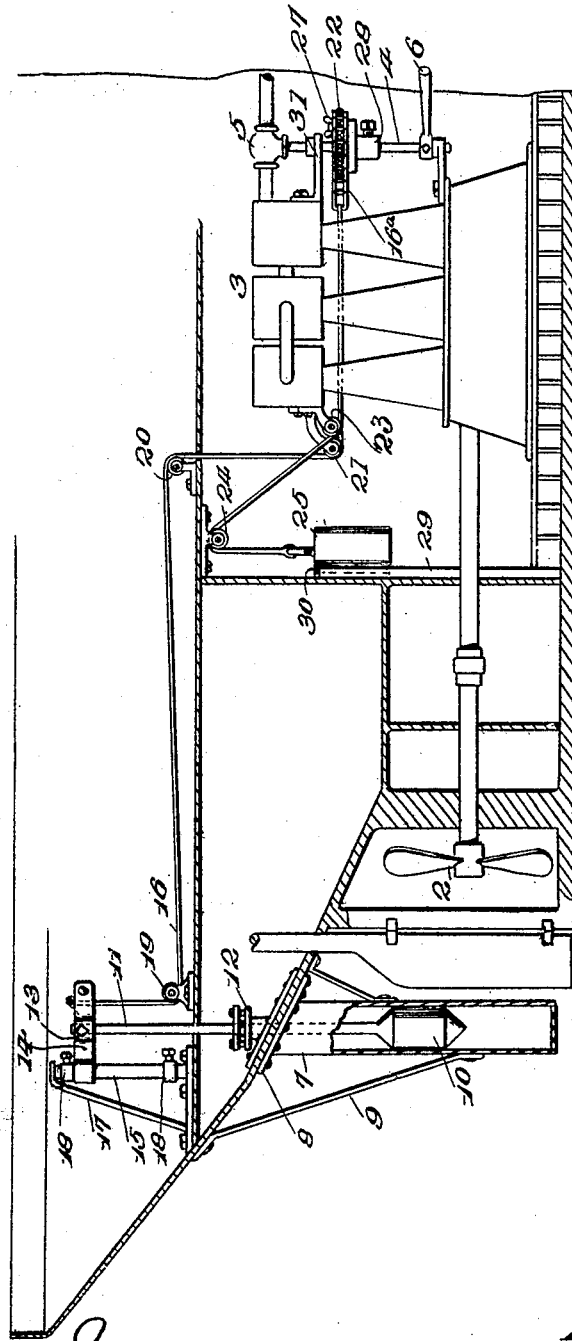
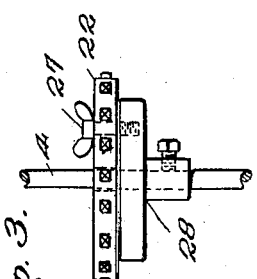
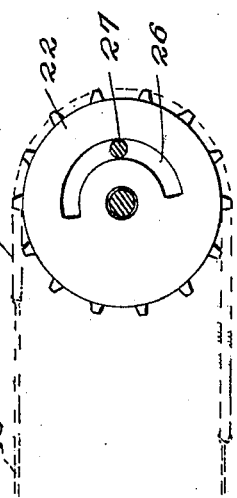
Inventors
L. E. L. Themke
Eugene LaForce

UNITED STATES PATENT OFFICE.

LOUIS E. L. THEMKE AND EUGENE LA FORCE, OF STRATHCONA, ALBERTA, CANADA.

MARINE-ENGINE GOVERNOR.

No. 916,627.  Specification of Letters Patent.  Patented March 30, 1909.

Application filed February 24, 1908. Serial No. 417,484.

*To all whom it may concern:*

Be it known that we, LOUIS E. L. THEMKE and EUGENE LA FORCE, subjects of the King of Great Britain, residing at Strathcona, Alberta, Canada, have invented certain new and useful Improvements in Marine-Engine Governors, of which the following is a specification.

In the operation of marine engines considerable difficulty is frequently encountered in stormy weather owing to the fact that as the vessel is tossed by the waves the propeller is at times either partially or entirely lifted out of the water, thereby reducing the resistance to the engine and causing the engine to run at an abnormal high speed or to "run away" as it is commonly termed. In view of this fact it has become customary to provide a man for opening and closing the throttle valve of the engine as the vessel is tossed, but this expedient is more or less unsatisfactory since it is virtually impossible for the man to operate the valve at the proper time.

The object of the present invention has accordingly been to design a novel form of governor which will operate in an entirely automatic and reliable manner to open and close the throttle valve at the exact time required to properly control the engine.

For a full description of the invention and the merits thereof and also to acquire a knowledge of the details of construction and the means for effecting the result, reference is to be had to the following description and accompanying drawings, in which:

Figure 1 is a sectional view through a vessel having the governor applied thereto. Fig. 2 is a plan view of the wheel upon the throttle rod. Fig. 3 is a side elevation of the same.

Corresponding and like parts are referred to in the following description and indicated in all the views of the drawings by the same reference characters.

The invention is shown for the purpose of illustration as applied to a vessel 1 driven by a propeller 2 operated by the marine engines 3. A rod 4 extends downwardly from the throttle valve 5 and is provided at its lower end with a lever 6 by means of which the valve may be manually opened and closed in the usual manner. A guide tube 7 is located at the stern of the vessel and may either project upwardly within the hold or be disposed in rear of the propeller 2 as in the present instance. A flange 8 is provided at the upper end of the guide tube by means of which the latter is secured to the vessel and a brace 9 is utilized for reinforcing the tube against lateral movement. Operating within this tube 7 is a float 10 and projecting upwardly from the float is a rod 11 passing through a stuffing box 12 at the upper end of the guide tube. It will thus be apparent that the tube serves the double function of guiding the float in its vertical movement and also of constituting a guard to protect the float. Adjustably clamped by means of the set screw 13 to the upper end of the float rod 11 is a head 14, the said head loosely engaging a guide rod 15 and also being provided with means for engaging a flexible member or cable 16. The guide rod 15 is secured to the frame 17 which is bolted or otherwise rigidly secured within the interior of the vessel, and stops 18 are adjustably mounted upon the guide rod to limit the vertical movement of the head, the said stops being shown in the present construction as constituted by set collars. Extending downwardly from the head 14 is the flexible member 16 which passes around a guide member or pulley 19 and then extends forwardly and around a guide member 20, downwardly and around a guide member 21, forwardly and around a wheel 22 upon the throttle rod 4, rearwardly and around a guide member 23 located adjacent the before mentioned guide member 21, upwardly and rearwardly around a guide member 24, and thence downwardly to the counter-weight 25 to which its extremity is attached. With this construction it will be obvious that the float 10 and weight 25 will rise and fall simultaneously with each other, the said members rising when the propeller is submerged and dropping when the propeller is partially or entirely lifted above the surface of the water. In this manner motion is transmitted through the medium of the flexible member 16 from the float to the wheel 22 upon the throttle rod, the said wheel being turned in one direction as the float drops and in the opposite direction when the float is elevated. In this connection, it may be stated that the flexible member 16 is preferably in the nature of a steel cable having a chain $16^a$ interposed in the length thereof, the said chain engaging teeth upon the periphery of the wheel 22. This wheel 22 is loose upon the throttle rod and is provided with a segmental slot 26 loosely receiving a clamping screw 27 projecting from a wheel 28 which is rigidly secured upon the throttle rod. When the clamping screw 27 is loose the wheel 22 revolves independently of the throttle rod and the throttle valve can be controlled in the usual manner through the medium of the hand lever 6. However when the clamping screw 27 is tightened the wheel 22 is rigid with the throttle rod and the float 10 and weight 25 act automatically to open and close the valve as the float rises and falls owing to the action of the waves. When the propeller 2 is entirely submerged the float 10 is elevated within the guide tube 7 and the throttle valve is opened to permit the engines running under full steam. As soon however, as the propeller is entirely or partially lifted out of the water the float 10 drops within the guide tube and operates to automatically decrease the supply of motive fluid to the engines the required amount so as to cause the engines to run at normal speed and prevent them from "running away."

For the purpose of preventing the weight 25 from swinging like a pendulum as the vessel rocks, a guide bar 29 is utilized, the said guide bar having a sliding connection with a member 30 carried by the weight, such a construction permitting the weight to move freely in a vertical direction but preventing lateral displacement. It will be observed that in the present instance a brace member 31 is provided to prevent bending of the throttle rod due to the tension in the flexible member 16. This brace may project from any suitable support and is provided with a bearing loosely receiving the throttle rod at a point adjacent the wheel 22. It is also desired to call attention to the specific formation of the float 10, the upper and lower ends of the same having a conical shape and being pointed to admit of the float rising and falling without occasioning the shock which would be present with a float provided with flat ends.

From the foregoing description it will be readily apparent that we have invented an improved marine engine governor which comprises few and simple parts and will operate automatically and with absolute precision to prevent the engine attaining an abnormal speed in stormy weather.

Having thus described the invention, what is claimed as new is:

1. A marine engine governor comprising a float, a wheel loose upon the throttle rod, a member rigid with the throttle rod and having a pin and slot connection with the wheel, means for clamping the wheel to the said member, and means for transmitting motion from the float to the wheel.

2. A marine engine governor comprising a float, a wheel loose upon the throttle rod and provided with a slot, a second wheel rigid with the throttle rod, a clamping screw extending through the slot and coöperating with the second mentioned wheel to clamp the first mentioned wheel rigidly therewith or permit the same to move independently thereof, and means for transmitting motion from the float to the first mentioned wheel.

3. A marine engine governor comprising a float, a rod projecting from the float, a head carried by the rod, a guide member for directing the movements of the head, a wheel upon the throttle rod, a vertically movable weight, and a flexible member extending around the wheel upon the throttle rod, one end of the flexible member being connected to the head of the rod upon the float while the opposite end is connected to the weight, the weight and float being mounted to rise and fall together.

4. A marine engine governor comprising a float, a rod projecting from the float, a head carried by the rod, a guide member for directing the movements of the head, adjustable stops upon the guide member for limiting the movement of the head, and means coöperating with the head for controlling the throttle valve.

In testimony whereof we affix our signatures in presence of two witnesses.

LOUIS E. L. THEMKE. [L. S.]
EUGENE LA FORCE. [L. S.]

Witnesses:
ALFRED L. MARKS,
JOHN R. LAVELL.